Patented May 19, 1953

2,639,274

UNITED STATES PATENT OFFICE 2,639,274

SULFONATED PHENOL FORMALDEHYDE CONDENSATION PRODUCT AND METHOD FOR MAKING SAME

Richard A. Salathiel, Houston, Tex., assignor, by mesne assignments, to Standard Oil Development Company, Elizabeth, N. J., a corporation of Delaware No Drawing. Application April 3, 1952, Serial No. 280,365

6 Claims. (Cl. 260—29.3)

The present invention relates to a new composition of matter and a method of making same. More particularly, the present invention relates to a novel water soluble salt of a sulfonated phenol formaldehyde condensation product and method for making same. The product is especially useful in drilling muds.

The present application is a continuation-in-part of application Serial No. 209,510, filed February 5, 1951, and now abandoned.

In my copending application Serial No. 259,790, filed December 4, 1951, I have suggested the use of water soluble salts of sulfonated phenol formaldehyde condensation products in drilling muds for reducing the loss of water therefrom by filtration. Since the filing of that application, I have found a method of preparing a condensation product which is much more stable during storage than the material originally disclosed.

The object of the present invention is to provide water soluble salts of sulfonated phenol formaldehyde condensation product which are stable during storage, particularly during storage at high atmospheric temperatures under humid conditions. A further object of the present invention is to provide a method of making such products. A further object is to provide a method of preparation whereby such stable products may be dried rapidly at atmospheric pressure rather than under vacuum.

In accordance with my invention the present method involves the condensation of a mixture of sulfonated phenol and phenol with formaldehyde in the presence of a suitable catalyst which ordinarily will be an acidic catalyst, preferably sulfuric acid. The sulfonated phenol should be largely mono-sulfonated with the sulfonic acid residue in the mono-sulfonated phenol being in either the ortho or the para position with respect to the hydroxyl group. If mono-sulfonated phenol and phenol are employed as starting materials, a small amount of sulfuric acid is added to a mixture of these materials before condensation with formaldehyde is commenced. Ordinarily, however, it will be found convenient to employ phenol as a starting material and to sulfonate it partially rather than to start with mono-sulfonated phenol and phenol.

When phenol is employed as the starting material, it is reacted with a slight molar excess of sulfuric acid at 100° C. for a time sufficient to convert a portion of the phenol to mono-sulfonated phenol. In practice, I have found it desirable to employ a sulfuric acid-to-phenol mol ratio in the range from 1.15 to 1.5, the mixture being reacted at 100° C. for about ½ hour in a closed vessel. On completion of the sulfonation reaction, the mixture is cooled to a temperature of 85° C. and dilute formaldehyde is added thereto with vigorous stirring as rapidly as the reaction heat can be dissipated from the reaction mixture without increasing the temperature thereof until about 0.75 to 0.85 mol of formaldehyde per mol of phenol have been added. The temperature of the reaction mixture is then raised to 95° C. and the remainder of the formaldehyde required to give a reaction mixture of the desired viscosity is added incrementally in small portions. The viscosity of the reaction mixture is continuously observed during the incremental addition of formaldehyde to prevent the reaction from proceeding so far as to produce water-insoluble products. When the reaction mixture has reached the desired viscosity a small amount of phenol is added thereto to stop the reaction. The reaction mixture, after the reaction is terminated, is cooled and neutralized with a suitable neutralizing agent such, for example, as an alkali metal hydroxide. The neutralized solution can be used as such in drilling mud or it can be dried by heating and the dried material used in drilling mud.

From the foregoing description it will be apparent that the amount of formaldehyde employed in the condensation reaction is carefully controlled. This is necessary in order to prepare chemically stable condensation products useful for mud treating for reducing the loss of water therefrom by filtration. Thus, stable products are prepared by limiting the amount of formaldehyde added to the reaction mixture to that required to give an adequately high viscosity grade of product. This is most conveniently accomplished by adding to the reaction mixture slightly more formaldehyde than that required to give the desired high viscosity grade of product and then adding to the reaction mixture a small amount of phenol to consume the remaining formaldehyde and thus to stop the reaction when the desired state of condensation has been reached.

As disclosed in my aforementioned patent application, Serial No. 259,790, 7.15% solutions (concentration based on the total phenol used to prepare the product) having viscosities greater than 6 to 7 centipoises at 26° C. were effective in reducing water loss from muds. However, products of somewhat higher viscosity were found to be more effective, the preferred range being above about 12 centipoises. In the preparation described in the present application, viscosity measurements were made on the hot (95° C.) solution, which contained at the termination of the reaction about 15.5% phenol, based on the total phenol used. Comparisons made on the solutions before and after dilution and neutralization showed viscosities of 12, 19, and 32 centipoises at 26° C. on the 7.15% neutralized solution to correspond to about 80, 150, and 300 centipoises at 95° C., respectively, on the 15.5% solution before neutralization.

The addition of less than the required amount of formaldehyde followed by heating the reaction mixture for a considerable time before adding more formaldehyde to permit the reaction mixture to reach the desired condition of molecular weight and viscosity served to make the products quite stable. This increased stability cannot be attributed to increased reaction time alone since a long reaction time is, of itself, not sufficient to give stable products. For example, if an appreciable excess of formaldehyde is added to the reaction mixture near the desired stopping point, an unstable product results even though the reaction mixture has been maintained at the reaction temperature for a long time.

As heretofore mentioned, it is desirable to employ a sulfuric acid-to-phenol mol ratio in the range of from 1.15 to 1.5. While the ratio of acid-to-phenol is not critical, experience has demonstrated the desirability of maintaining the proportions in the aforementioned range. The use of substantially larger amounts of sulfuric acid than that specified above serves to diminish the amount of unsulfonated phenol available for the condensation reaction and diminishes the yield of the desired high molecular weight water soluble product. On the other hand, use of an insufficient amount of sulfuric acid leads to the presence of excessively large amounts of unsulfonated phenol following sulfonation which, in turn, leads, during the condensation reaction, to the formation of simple phenol formaldehyde condensation products which separate from the reaction mixture and which are not water soluble. Preferably, the sulfuric acid-to-phenol ratio employed is in the lower portion of the range aforementioned.

It should be noted that the mol ratios of sulfuric acid-to-phenol cited refer to a sulfonation reaction carried out in a closed vessel from which water of reaction does not escape. Removal of water during the sulfonation reaction causes the sulfonation reaction to proceed farther so that a larger proportion of the phenol is sulfonated; under such conditions lower ratios of sulfuric acid-to-phenol might be employed to obtain the desired extent of sulfonation in the reaction mixture.

In order to illustrate the method of the present invention, the following example is given:

In a 3-neck flask fitted with a stirrer and a thermometer 75 grams of phenol were heated at 100° C. for ½ hour with 100 grams of concentrated sulfuric acid. A solution in 152 cc. water of 50 cc. (53.4 grams) of U. S. P. formaldehyde (about 37.1% by weight of formaldehyde) was added dropwise (the addition requiring ½ hour) while maintaining the temperature at 85° C. Then 100 cc. more water was added and the mixture held at 95° C. for 40 minutes. The viscosity of the hot reaction mixture reached 3.5 cps. and then would go no higher. Two cc. more formaldehyde was added and heating continued (at 95° C.) for 105 minutes. The viscosity reached 8.5 cps. and then failed to go higher. Then 1.3 cc. more formaldehyde was added and heating continued for 40 minutes. Viscosity reached 16.5 cps. and increased no more. Addition of 0.6 cc. more formaldehyde and heating for an hour increased the viscosity to a stable value of about 38 cps. Adding 0.2 cc. more formaldehyde and heating for 50 minutes increased the viscosity to 75 cps. Then 0.2 cc. more formaldehyde was added (total added 54.3 cc.). This caused the viscosity to increase rapidly. It reached 150 cps. in 12 minutes and obviously would have gone much higher. The reaction was stopped at this time by adding a solution of 5 grams phenol and 2 grams water. The viscosity of the hot reaction mixture dropped to a stable value of 135 cps. (It would have been better to use a smaller amount of phenol to stop this reaction because excess phenol induces some foaming in muds treated with the material.) The acidic solution was neutralized to a phenolphthalein end point by adding 120 cc. of 40% caustic soda solution. The neutralized solution after dilution to 725 grams by addition of water had a viscosity at 26° C. of 122 cps.

The effects of additions of the above described stable sulfonated phenol formaldehyde condensation product on properties of a 5% salt water mud are shown in the following table:

Table.—Effects of sodium salt of sulfonated phenol formaldehyde condensation product on properties of 5% salt water mud

[Mud composed of 26% commercial surface clay mined in Texas dispersed in 74% of 5% salt solution]

| SPF Content of Mud: Percent Based on Phenol Reacted, SPF-S-4 | Viscosity at 600 R. P. M., Stormer, cps. | 3-Minute Gel Strength, gms., Stormer | Filtration Rate, cc. in 30 Min., API |
|---|---|---|---|
| 0.00 | 26 | 42 | 30.5 |
| .13 | 27 | 45 | 15.9 |
| .26 | 26 | 42 | 11.3 |
| .52 | 25 | 41 | 7.3 |
| 1.04 | 26 | 34 | 5.3 |

It will be noted that the sulfonated phenol formaldehyde condensation product made in the manner hereinbefore described markedly reduces the loss of water from a drilling mud by filtration. Furthermore, extensive tests have indicated that the material prepared in the aforedescribed manner can be dried at atmospheric pressure above the boiling point of water and that it is stable in storage even at high temperature and humidity.

Having fully described the method of the present invention hereinbefore, what I wish to claim as new and novel and to secure by Letters Patent is:

1. The method of preparing a water soluble salt of a sulfonated phenol formaldehyde condensation product which comprises forming a starting mixture of mono-sulfonated phenol, phenol, water and sulfuric acid, adding formaldehyde to said starting mixture while maintaining said mixture at a condensation temperature of about 85° C. to cause reaction between the phenol, mono-sulfonated phenol, and formaldehyde, the formaldehyde being added in an amount sufficient to result in a reaction mixture of about 15.5% concentration, based on the total phenol present in said starting mixture, said total phenol including free phenol and the phenol radical in said sulfonated phenol, having a viscosity in the range of 80 to 300 centipoises at 95° C., then adding a sufficient amount of phenol to the reaction mixture to stop further condensation therein, and neutralizing the condensation products with an aqueous solution of alkali metal hydroxide to form an aqueous solution containing a water soluble salt of sulfonated phenol formaldehyde condensation product.

2. A method of preparing a water soluble salt of a sulfonated phenol formaldehyde condensation product which comprises forming a mixture of concentrated sulfuric acid and phenol at a temperature of 90° to 100° C., the mol ratio of sulfuric acid-to-phenol in said mixture being in the range of 1.15 to 1.5, maintaining said mixture of sulfuric acid and phenol at a temperature of 90° to 100° C. in a closed vessel for a time sufficient to form an equilibrium quantity of sulfonated phenol therein, after which said mixture is cooled to 85° C., adding aqueous formaldehyde to the cooled mixture while maintaining the mixture at 85° C. until 0.75 to 0.85 mols of formaldehyde per mol of phenol have been added to the mixture, then raising the temperature of the reaction mixture to 95° C. and adding incrementally in small portions a sufficient additional amount of formaldehyde to the reaction mixture to result in a reaction mixture of about 15.5% concentration based on the total phenol employed in the reaction having a viscosity in the range of 100 to 300 centipoises at 95° C., then adding a sufficient amount of phenol to said reaction mixture to stop further condensation therein, and neutralizing the reaction mixture to which phenol was added with an aqueous solution of alkali metal hydroxide to form an aqueous solution containing a water soluble salt of sulfonated phenol formaldehyde condensation product.

3. A method of preparing a water soluble salt of a sulfonated phenol formaldehyde condensation product which comprises forming a mixture of concentrated sulfuric acid and phenol at a temperature of 90° to 100° C., the mol ratio of sulfuric acid-to-phenol in said mixture being in the range of 1.15 to 1.5, maintaining said mixture of sulfuric acid and phenol at a temperature of 90° to 100° C. in a closed vessel for a time sufficient to form an equilibrium quantity of sulfonated phenol therein, after which said mixture is cooled to 85° C., adding aqueous formaldehyde to the cooled mixture while maintaining the mixture at 85° C. until 0.75 to 0.85 mols of formaldehyde per mol of phenol have been added to the mixture, then raising the temperature of the reaction mixture to 95° C. and adding incrementally in small portions a sufficient additional amount of formaldehyde to the reaction mixture to result in a reaction mixture of about 15.5% concentration based on the phenol employed in the reaction having a viscosity in the range of 100 to 300 centipoises at 95° C., then adding a sufficient amount of phenol to said reaction mixture to stop further condensation therein, and neutralizing the reaction mixture to which phenol was added with an aqueous solution of alkali metal hydroxide to form an aqueous solution containing a water soluble salt of sulfonated phenol formaldehyde condensation product and evaporating said aqueous solution containing the water soluble salt to dryness at atmospheric pressure to recover said salt.

4. A water soluble salt of a sulfonated phenol formaldehyde condensation product which is made by forming a starting mixture of mono-sulfonated phenol, phenol, water and sulfuric acid, adding formaldehyde to said starting mixture while maintaining said mixture at a condensation temperature of about 85° C. to cause reaction between the phenol, mono-sulfonated phenol, and formaldehyde, the formaldehyde being added in an amount sufficient to result in a reaction mixture of about 15.5% concentration, based on the total phenol present in said starting mixture, said total phenol including free phenol and the phenol radical in said sulfonated phenol, having a viscosity in the range of 80 to 300 centipoises at 95° C., then adding a sufficient amount of phenol to the reaction mixture to stop further condensation therein, and neutralizing the condensation products with an aqueous solution of alkali metal hydroxide to form an aqueous solution containing a water soluble salt of sulfonated phenol formaldehyde condensation product.

5. A water soluble salt of a sulfonated phenol formaldehyde condensation product which is made by forming a mixture of concentrated sulfuric acid and phenol at a temperature of 90° to 100° C., the mol ratio of sulfuric acid-to-phenol in said mixture being in the range of 1.15 to 1.5, maintaining said mixture of sulfuric acid and phenol at a temperature of 90° to 100° C. in a closed vessel for a time sufficient to form an equilibrium quantity of sulfonated phenol therein, after which said mixture is cooled to 85° C., adding aqueous formaldehyde to the cooled mixture while maintaining the mixture at 85° C. until 0.75 to 0.85 mols of formaldehyde per mol of phenol have been added to the mixture, then raising the temperature of the reaction mixture to 95° C. and adding incrementally in small portions a sufficient additional amount of formaldehyde to the reaction mixture to result in a reaction mixture of about 15.5% concentration based on the total phenol employed in the reaction having a viscosity in the range of 100 to 300 centipoises at 95° C., then adding a sufficient amount of phenol to said reaction mixture to stop further condensation therein, and neutralizing the reaction mixture to which phenol was added with an aqueous solution of alkali metal hydroxide to form an aqueous solution containing a water soluble salt of sulfonated phenol formaldehyde condensation product.

6. A water soluble salt of a sulfonated phenol formaldehyde condensation product made by forming a mixture of concentrated sulfuric acid and phenol at a temperature of 90° to 100° C., the mol ratio of sulfuric acid-to-phenol in said mixture being in the range of 1.15 to 1.5, maintaining said mixture of sulfuric acid and phenol at a temperature of 90° to 100° C. in a closed vessel for a time sufficient to form an equilibrium quantity of sulfonated phenol therein, after which said mixture is cooled to 85° C., adding aqueous formaldehyde to the cooled mixture while maintaining the mixture at 85° C. until 0.75 to 0.85 mols of formaldehyde per mol of phenol have been added to the mixture, then raising the temperature of the reaction mixture to 95° C. and adding incrementally in small portions a sufficient additional amount of formaldehyde to the reaction mixture to result in a reaction mixture of about 15.5% concentration based on the phenol employed in the reaction having a viscosity in the range of 100 to 300 centipoises at 95° C., then adding a sufficient amount of phenol to said reaction mixture to stop further condensation therein, and neutralizing the reaction mixture to which phenol was added with an aqueous solution of alkali metal hydroxide to form an aqueous solution containing a water soluble salt of sulfonated phenol formaldehyde condensation product and evaporating said aqueous solution containing the water soluble salt to dryness at atmospheric pressure to recover said salt.

RICHARD A. SALATHIEL.

References Cited in the file of this patent

UNITED STATES PATENTS

| Number | Name | Date |
|---|---|---|
| 1,133,108 | Dehnel | Mar. 23, 1915 |

FOREIGN PATENTS

| Number | Country | Date |
|---|---|---|
| 8,511 of 1912 | Great Britain | Jan. 23, 1913 |